April 18, 1967 E. J. NIEHAUS, JR., ET AL 3,314,312
VARIABLE SPEED POWER FEED MECHANISM FOR
DRILL PRESSES AND LIKE POWER TOOLS
Filed July 7, 1964 5 Sheets-Sheet 1

INVENTOR
EDWARD J. NIEHAUS JR.
EDWARD C. WARRICK

BY Strauch, Nolan & Neale

ATTORNEYS

April 18, 1967 E. J. NIEHAUS, JR., ET AL 3,314,312
VARIABLE SPEED POWER FEED MECHANISM FOR
DRILL PRESSES AND LIKE POWER TOOLS
Filed July 7, 1964 5 Sheets-Sheet 2
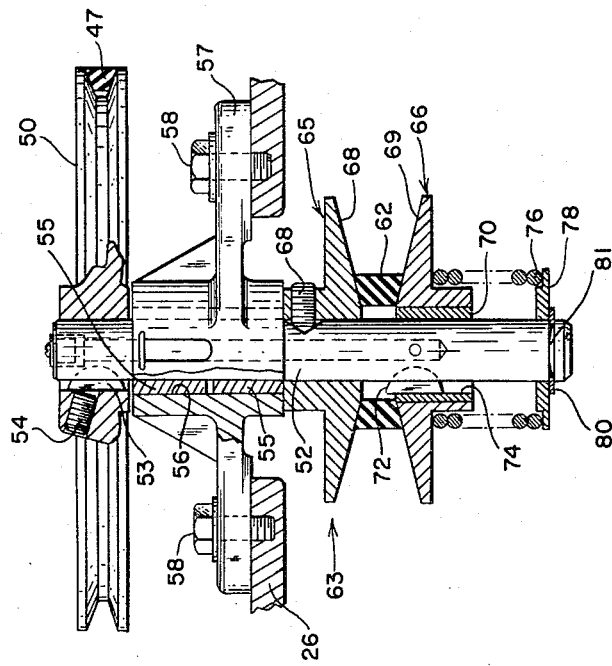
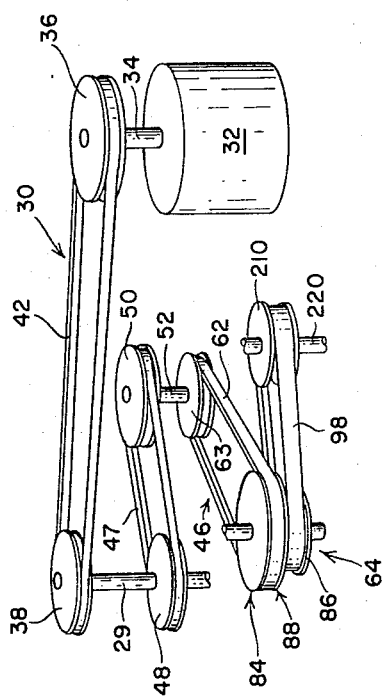
INVENTOR
EDWARD J. NIEHAUS JR.
EDWARD C. WARRICK
BY *Strauch, Nolan & Neale*
ATTORNEYS

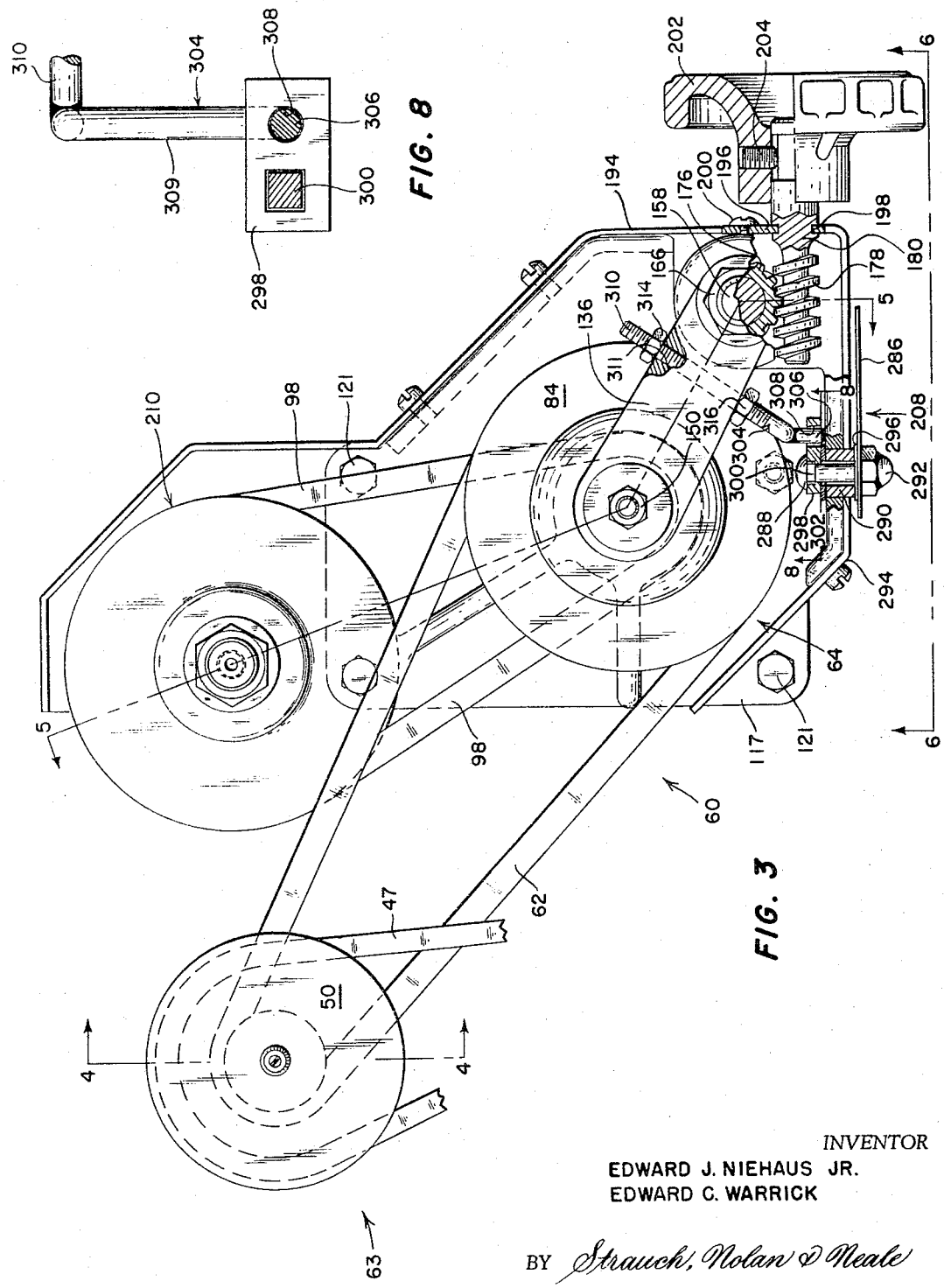

INVENTOR
EDWARD J. NIEHAUS JR.
EDWARD C. WARRICK

April 18, 1967  E. J. NIEHAUS, JR., ET AL  3,314,312
VARIABLE SPEED POWER FEED MECHANISM FOR
DRILL PRESSES AND LIKE POWER TOOLS
Filed July 7, 1964  5 Sheets-Sheet 5

INVENTOR
EDWARD J. NIEHAUS JR.
EDWARD C. WARRICK

BY *Strauch, Nolan & Neale*

ATTORNEYS

United States Patent Office 3,314,312
Patented Apr. 18, 1967

3,314,312
VARIABLE SPEED POWER FEED MECHANISM FOR DRILL PRESSES AND LIKE POWER TOOLS
Edward J. Niehaus, Jr., and Edward C. Warrick, both of Pittsburgh, Pa., assignors to Rockwell Manufacturing Company, Pittsburgh, Pa., a corporation of Pennsylvania
Filed July 7, 1964, Ser. No. 380,819
15 Claims. (Cl. 77—33.8)

The present invention relates to improvements in power tools and also to improvements in variable speed transmissions. This invention is especially concerned with power feed devices for power tools in which the cutting tool is simultaneously fed longitudinally and rotated and, in particular, drill presses.

Experience has shown that a high degree of accuracy and efficiency in drilling and like operations can be achieved only if the drill bit is power fed into the work at a carefully predetermined rate correlated with the bit rotation rate. As a result, many variations of power feed mechanisms have been proposed prior to this invention such as, for example, that disclosed in United States Letters Patent No. 3,118,325 issued to D. D. Pettigrew on Jan. 21, 1964 and entitled, "Combined Manual and Power Feed for Drill Press."

The tool feed mechanism described in the aforesaid Pettigrew patent comprises a stepped pulley and belt transmission for selectively adjusting the tool feed rate. This type of tool feed transmission, however, permits selection among only a limited number of discrete variations within a limited range of the ratio of tool feed rate to tool rotation rate. For example, a commercially available construction of the drill press described in the aforesaid Pettigrew patent provides feed rates of 0.003, 0.009, 0.012 and 0.015 inch per revolution of the tool spindle with the result that the feed rate cannot be accurately matched to the spindle rotational speed.

For each tool bit and each type of material, however, there is an optimum ratio between the feed rate and the bit rotation rate that should be maintained in order to minimize spoilage of workpieces as a result of gouging for example and damage to or premature dulling of the cutting tool. As a consequence, the usefulness and versatility of a drill press or like power tool incorporating such a stepped pulley power feed transmission as described in the aforesaid Pettigrew patent is objectionably impaired since the selectable ratio of tool feed rate to bit rotation rate frequently is not substantially equal to the desired optimum ratio. Thus, by so limiting the number of different selected ratios, use of a drill press on many materials in wide use in industry today is impractical. In addition, the shifting of the tool feed drive belts along complementary stepped cone pulleys is cumbersome and requires the operator to stop the machine with the result that production is interrupted or the operator will use an improper ratio rather than make the necessary adjustment.

It is, therefore, a primary object of this invention to provide a novel variable speed power feed mechanism equipped power tool such as a drill press which permits the selection of the ratio of tool feed rate to bit rotation rate that exactly conforms to a desired, optimum ratio within a wide range. According to this invention, the ratio of tool feed rate to bit rotation rate is rendered steplessly variable within a predetermined range by means of a novel V-belt variable speed pulley drive assembly which derives its power from the tool spindle drive train and imparts power to the spindle feed mechanism for advancing the cutting tool in a tool feeding direction. This variable speed pulley assembly is especially constructed to keep the drive belts accurately aligned to minimize wear, to fit in a relatively small space, to permit easy, instant, and accurate manual adjustment of the ratio of tool feed rate to spindle rotation rate even when the machine is in operation, and to eliminate slippage for more positively relating the tool feed rate to the spindle speed. As a consequence, the variable speed pulley drive of this invention is not only adapted for ready adjustment to minimize loss of time, but also is capable of maintaining an optimum, adjusted feed rate which is correlated with the spindle rotational speed to minimize gouging of the workpiece and tool damage.

Accordingly, a more specific object of this invention is to provide a power tool such as a drill press with a novel steplessly variable speed pulley assembly type of power feed drive train which is quick and easy to adjust within a predetermined range even while the machine is in operation.

Still another object of this invention is to provide a power tool with a novel steplessly variable speed power feed transmission that is drive connected to the tool carrying spindle to axially advance the cutting tool at a selected speed that is correlated with the spindle rotational speed.

Another and more specific object of this invention is to provide a power tool with a novel power feed mechanism having a steplessly variable speed drive pulley assembly wherein the outer sheave segments of the pulley assembly are selectively, axially shiftable as a unit with respect to a fixed center sheave for varying the pulley transmission speed ratio.

Yet another object of this invention is to provide a novel belt drive and steplessly variable speed pulley assembly which is particularly adapted for use in power tool power feed transmissions and which is of simplified, rugged, and compact construction.

Further objects of this invention will presently appear as the description proceeds in connection with the appended claims and the annexed drawings wherein:

FIGURE 2 is a fragmentary, partially schematic perspective view of the belt and pulley assembly drive train for rotating and advancing the drill spindle in a tool feeding direction;

FIGURE 3 is a horizontal section taken substantially along lines 3—3 of FIGURE 1 and showing details of the variable pulley and shaft assembly of the power mechanism;

FIGURE 4 is a section taken substantially along lines 4—4 of FIGURE 3;

FIGURE 8 is a fragmentary section taken substantially along lines 8—8 of FIGURE 3.

Figure 1:
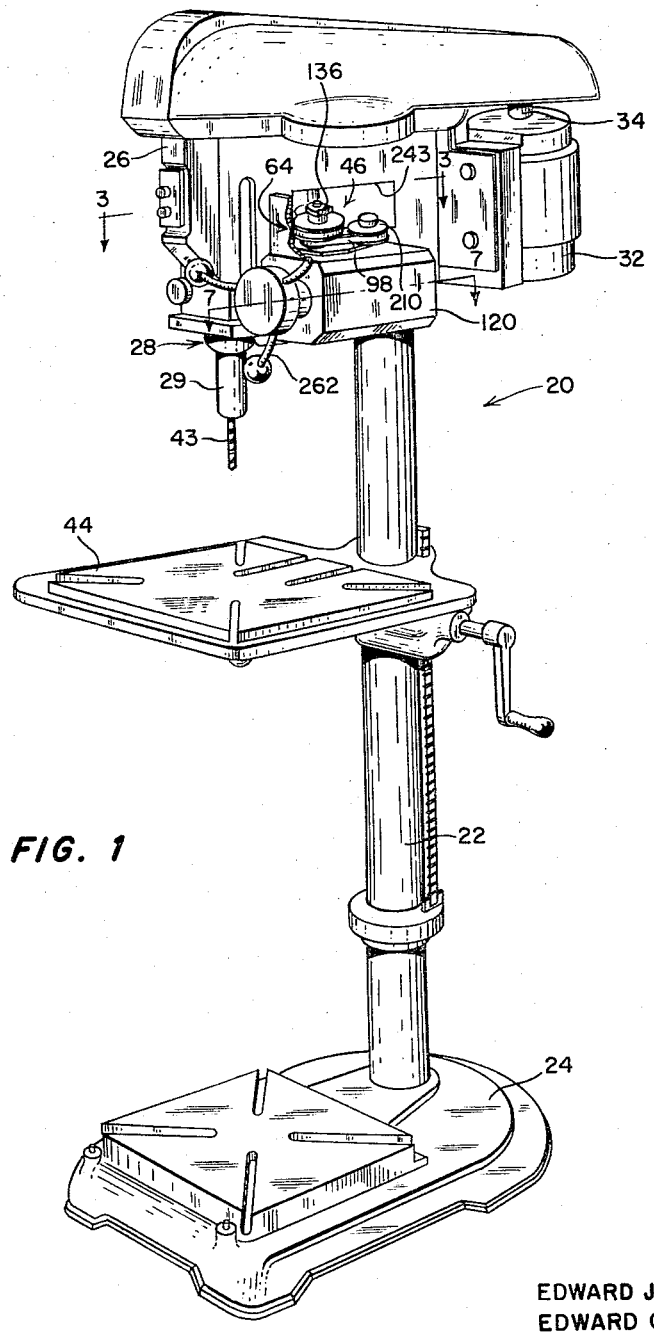
FIGURE 1 is a perspective view of a complete drill press incorporating the present invention.

Referring now to the drawings and more particularly to FIGURE 1 wherein a construction embodying the principles of this invention is shown, the reference numeral 20 generally designates a drill press comprising a rigid upright column 22 which is mounted at its lower end on a conventional support 24. Mounted on the upper end of column 22 is a drill head assembly comprising a hollow housing 26. A quill and drill spindle assembly 28 is reciprocably mounted in housing 26 by suitable means (not shown) and comprises a conventionally rotatably mounted spindle 29.

As best shown in FIGURE 2, spindle 29 is rotatably driven through a conventional belt drive and steplessly variable speed pulley assembly 30 by a rear mounted electric motor 32 having an output shaft 34. Assembly 30 preferably is the same as that described in application Ser. No. 214,226 filed Aug. 2, 1962 by David D. Pettigrew for Vibration Reducing Device and Method, and now Patent No. 3,156,127, and is shown in FIGURE 2 herein to comprise a variable pitch drive pulley 36 and a variable pitch driven pulley 38 which are respectively non-rotatably mounted on shaft 34 and spindle 29 by suitable spline connections. A belt 42 trained around pulleys 36 and 38 transmits torque from motor 32 to rotate spindle 29 in the usual manner. The pitch diameters of pulleys 36 and 38 are adjustable as described in the aforesaid application to selectively vary the rotational speed of spindle 29.

As shown in FIGURE 1, spindle 29 carries at its lower end a chuck in which a drill 43 or other tool is held over a workpiece (not shown) mounted on a suitable work supporting table 44. Table 44 is adjustably mounted on column 22 beneath spindle 29 in any suitable manner.

For further details of the foregoing drill press construction reference is made to the aforesaid Pettigrew patent application.

In accordance with this invention, quill and spindle assembly 28 is axially advanced in a tool feeding direction, as shown in FIGURE 2, by a novel power feed mechanism 46 comprising a V-belt 47 trained around drive and driven pulleys 48 and 50. Pulley 48 is mounted for rotation with spindle 29 by a suitable spline connection which permits vertical displacement of spindle 29 relative to pulley 48.

As best shown in FIGURE 4, pulley 50 is fixed to a counter shaft 52 by a groove seated key 53 which is retained in place by a set screw 54. Shaft 52 is journalled for rotation about an axis extending parallel to the rotational axis of spindle 29 by a pair of axially aligned bushings 55. Bushings 55 are pressed fitted in a smooth walled through bore 56 formed in a mounting bracket 57 which is fixed to housing 26 by cap screws 58. Shaft 52 is axially retained in place on housing 26 by abutment of pulley 50 and sheave 65 against the top and bottom surfaces of bracket 57.

As shown in FIGURES 3 and 4, feed mechanism 46 further comprises a two stage belt drive 60 for transmitting power from shaft 52 to advance spindle 29 in a tool feeding direction. The first stage of drive 60 (FIGURE 3) is formed by a V-belt 62 which drive connects a resiliently expansible, variable pitch pulley assembly 63 to the input side of an intermediate steplessly variable speed pulley drive assembly 64. Pulley assembly 63, as best shown in FIGURE 4, comprises a pair of axially spaced pulley sheave segments 65 and 66 respectively having opposed segmental conical faces 68 and 69 engaging V-belt 62. Sheave segment 65 is coaxially fixed on shaft 52 below bracket 57 by a set screw 68. Sheave segment 56 is non-rotatably and slidably mounted on the lower end of shaft 52 by an assembly comprising a bushing 70 and a key 72. Bushing 70 is pressed into the hub of sheave segment 66 and is formed with a longitudinal keyway 74. Key 72 is slidably received in keyway 74 and is fixedly seated in an arcuate groove formed in shaft 52 below sheave segment 65.

With continued reference to FIGURE 4, sheave segment 66, according to this invention, is axially biased toward sheave segment 65 by a helical coil spring 76 which surrounds shaft 52 and which reacts against a spring retaining washer 78 coaxially mounted on the lower end of shaft 52. Spring 76 urges washer 78 into radial bearing engagement with a retainer ring 80 seated in an annular groove 81 at the lower end of shaft 52.

Figure 5:
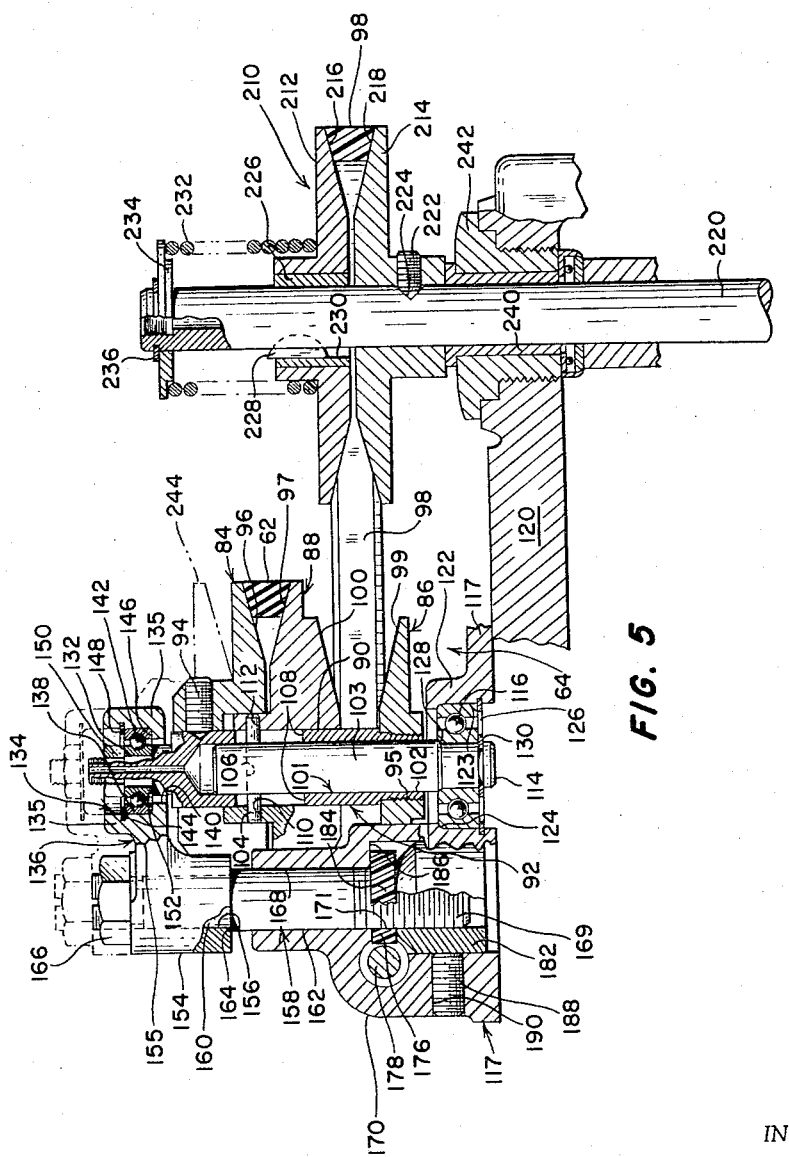
FIGURE 5 is a section taken substantially along lines 5—5 of FIGURE 3.

As best shown in FIGURE 5, pulley drive assembly 64 comprises a pair of spaced apart, axially shiftable outer sheave segments 84 and 86 and a center fixed sheave segment 88 disposed axially between sheave segments 84 and 86. Sheave segments 84, 86, and 88 are coaxially mounted on an enlarged section 90 of an upstanding rigid sleeve 92. Sheave segment 84 is fixed to the upper end of sleeve section 90 by a set screw 94. Sheave segment 86, which is mounted below sheave segment 88, is coaxially provided with a tapped through bore 95 that threadedly receives the lower end of sleeve section 90 to maintain sheave segment 86 in fixed, axially spaced apart relationship to sheave segment 84.

As shown in FIGURE 5, sheave segments 84 and 88 are respectively formed with opposed, segmental conical faces 96 and 97 which respectively engage V-belt 62. A V-belt 98 forming the second stage of drive 60 is trained between sheave segments 86 and 88 and engages opposed, segmental, conical faces 99 and 100 respectively formed on sheave segments 86 and 88.

With continued reference to FIGURE 5, sleeve 92 is coaxially formed with a stepped through bore 101 having enlarged bore section 102 which is coextensive with sleeve section 90 and which coaxially and rotatably receives a support shaft 103. A roll pin 104 extending through a transverse through bore 106 in shaft 103 slidably projects at both ends through diametrically opposed slots 108 formed in sleeve section 90. The opposite ends of pin 104 projecting beyond sleeve 92 extend into radially aligned bores 110 and 112 formed in the hub of sheave 88 to thereby fix sheave segment 88 to shaft 103.

With continued reference to FIGURE 5, the lower end of shaft 103 projecting coaxially beyond bore section 102 terminates in a reduced diametered end section 114 which is journalled by a conventional ball bearing assembly 116 on a rigid support bracket 117. Bracket 117 is secured on the top wall of a gear box 120 (see FIGURE 1) as by screws 121 (FIGURE 3). Gear box 120 is preferably of the same construction described in the aforesaid Pettigrew patent and is fixed to housing 26 in the manner disclosed in said Pettigrew patent.

Bearing assembly 116, as shown in FIGURE 5, is coaxially received in a hollow boss 122 formed integral with bracket 117 and having a stepped bore 123. The outer race of assembly 116 is pressed into bore 123 and is axially retained in place between an annular shoulder 124 formed in bore 123 and a groove seated snap ring 126. The inner race of bearing assembly 116 is axially retained in place between an annular shoulder 128 formed on shaft 103 and a groove seated snap ring 130 carried by the lower end of the shaft section 114.

With the foregoing variable speed pulley drive construction, it is clear that shaft 103 is axially fixed in place on gear box 120 and is rotatable with sleeve 92 through the drive connection established by the engagement of roll pin 104 with the opposed side walls of slots 108. Sleeve 92 is axially displaceable along shaft 103 between positions limited by engagement of pin 104 with the axially opposed ends of slots 108.

With continuing reference to FIGURE 5, sleeve 92 is formed with a reduced diametered upper end section 132 which extends freely and coaxially through a cylindrical stepped bore 134. Bore 134 is formed in a boss portion 135 of a sheave lifter arm 136 and has an enlarged diametered section 138 and a reduced diametered section 140. A conventional ball bearing assembly 142 journalling sleeve 92 on lifter arm 136 has its outer race pressed in bore section 138. The outer race of bearing assembly 142 is axially held in place between a split retainer ring 144 and an annular shoulder 146 formed in bore 134 between sections 138 and 140. Retainer ring 144 is seated in an inwardly opening annular groove 148 formed in bore section 138 in the manner shown. The inner race of bearing assembly 142 is carried by sleeve section 132 and is axially held in place between a nut 150 threaded on the end of sleeve section 132 and an annular shoulder 152 formed on sleeve 92 between sections 90 and 132. Thus it is apparent that sleeve 92 is rotatably carried by arm 136 and is axially displaceable therewith as a unit.

With continuing reference to FIGURE 5, arm 136 is provided with a boss portion 154 which is joined to boss portion 135 by a lateral web 155 and which is formed with a smooth walled through bore 156. Bore 156 extends along an axis that is parallel to and laterally offset from the rotational axis of sleeve 92. A cylindrical pulley shift bar 158 for supporting arm 136 is formed with a circular cross-section and is stepped to provide a reduced diametered section 160 and an enlarged diametered section 162 separated from section 160 by a radially extending annular shoulder 164. Section 160 extends coaxially and rotatably through bore 156 with shoulder 164 in bearing engagement with the underside of boss portion 154. A nut 166 threaded on the upper end of section 160 draws shoulder 164 tightly against boss portion 154 to securely mount arm 136 on bar 158. Thus it is clear that arm 136 is mounted on the upper, corresponding ends of bar 158 and sleeve 92. Shift bar 158 and sleeve 92, as best shown in FIGURE 5, extend downwardly from arm 136 in side-by-side, spaced, parallel relationship.

As shown in FIGURE 5, section 162 of bar 158 rotatably and coaxially extends into a smooth walled, through bore 168 formed in an upstanding boss portion 170 which is integral with bracket 117. Shift bar 158 terminates at its lower end in a threaded section 169 which extends through and engages a tapped bore 171 formed in a flat-sided helical pitch gear 176. Gear 176 constantly meshes with a helical pinion 178 formed integral with a control shaft 180 (FIGURE 3).

The lower end of bore 168, as seen from FIGURE 5, is enlarged to receive a thrust bushing 182 having a flat end face 184 bearing against the underside of gear 176. Gear 176 is axially retained in place between bushing 182 and a downwardly facing abutment surface 186 formed in boss portion 170. Bushing 182 coaxially and rotatably receives the lower end of shift bar 158 and is fixed in place by a set screw 188 which is threaded into a tapped bore 190 formed in boss portion 170 at right angles to bore 168.

Referring back to FIGURE 3, shaft 180 is shown to be mounted for rotation about an axis extending at right angles to the axis of bar 158 and extends through an upstanding rigid guard 194 which is fixed to bracket 117 by any suitable means. Shaft 180 is retained against axial displacement by a rigid retaining finger 196 which projects into an outwardly opening annular groove 198 formed in shaft 180. Finger 196 is fixed to guard 194 by a machine screw 200. A knob 202 fixed by a set screw 204 on the end of shaft 180 projecting forwardly from the front face of guard 194 is manually manipulatable to selectively rotate shaft 180 in opposite directions.

By turning shaft 180 in either direction, shift bar 158 is threaded through gear 176 which is axially retained in place on bracket 117. This axial displacement of bar 158 axially shifts arm 136 and sleeve 92 as a unit. Sheave segments 84 and 86, which are axially fixed for unitary movement with sleeve 92, are thus axially displaced relative to sheave segment 88 which is fixed against axial displacement on bracket 117. Thus, sheave segments 84 and 86 are selectively, axially displaceable as a unit relative to sheave segment 88 to vary the pulley pitch diameters cooperating with V-belts 62 and 98. Upward axial displacement of sheave segments 84 and 86 increases the pitch diameter of the pulley assembly cooperating with V-belt 62 and correspondingly reduces the pitch diameter of the pulley assembly cooperating with V-belt 98. Similarly, downward axial displacement of sheave segments 84 and 86 decreases the pitch diameter of the pulley assembly cooperating with V-belt 62 and correspondingly increases the pitch diameter of the pulley assembly cooperating with V-belt 98. As will be described in detail later on, a visual indicator assembly 208 (FIGURE 6) is operatively connected to shaft 180 to provide a direct reading of the feed rate to which pulley assembly 64 is adjusted by manipulation of knob 202.

As best shown in FIGURE 5, V-belt 98 drive connects the output side of pulley assembly 64 to a driven, resiliently expansible, variable pitch pulley assembly 210. Assembly 210 comprises a pair of cooperating sheave segments 212 and 214 respectively having opposed, segmental conical faces 216 and 218 engaging V-belt 98. Sheave segment 214 is coaxially fixed on a shaft 220 by a set screw 222 having a pointed conical end seated in a notch 224 formed in shaft 220 intermediate the ends thereof.

With continued reference to FIGURE 5, sheave segment 212 is non-rotatably and slidably mounted on shaft 220 above sheave segment 214 by an assembly comprising a bushing 226 and a key 228. Bushing 226 is pressed fitted into the hub of sheave segment 212 and is formed with a longitudinal keyway 230. Key 228 slidably extends into keyway 230 and is fixedly seated in an arcuate groove formed in shaft 220 above sheave segment 214.

In accordance with this invention, sheave segment 212 is axially biased toward sheave segment 214 by a helical coil spring 232 which surrounds shaft 220 and which reacts against a spring retaining washer 234 coaxially mounted on the upper end of shaft 220. Spring 232 urges washer 234 into radial bearing engagement with a retainer ring 236 seated in an annular groove formed in the upper end of shaft 220.

From the foregoing description of the steplessly variably speed pulley transmission it is apparent that sheave segments 65 (FIGURE 4) and 214 (FIGURE 5), which are axially secured to shafts 52 and 220, respectively have belt engaging surfaces facing in opposite directions and that sheave segments 66 (FIGURE 4) and 212 (FIGURE 5) are respectively biased in opposite directions towards sheave segments 65 and 214. Belt 62 is consequently confined between conical faces 68 and 97 of sheave segments 65 and 88 respectively. Similarily, belt 98, as a result of the foregoing pulley transmission construction, is confined between the axially fixed conical faces 100 and 218 which face in opposite directions. By axially fixing sheave segments 65 and 214 in predetermined relation with sheave 88 of pulley assembly 64 with this arrangement of parts, belts 62 and 98 are maintained substantially parallel and at right angles to the rotational axes of pulley assemblies 63, 64, and 210 throughout the range of adjustment of pulley assembly 64. In this connection, it will be appreciated that when sheave segments 84 and 86 are in their lowermost solid-line positions illustrated in the drawings, the pitch diameters of pulley assemblies 63 and 210 are respectively at a minimum and a maximum. When sheave segments 84 and 86 are shifted axially upwardly to their uppermost positions shown by the dot-dash lines indicated at 244 in FIGURE 5, belt 62 riding along the confining pulley faces 68 and 97 shifts axially upwardly and to the left as viewed from FIGURES 4 and 5, and sheave segment 66 is biased upwardly by spring 76 to thereby increase the pitch diameter of pulley assembly 63 to prevent belt 62 from becoming objectionably misaligned. In a similar fashion, belt 98 riding along its confining conical pulley faces 90 and 218 moves axially upwardly and to the left as viewed from FIGURES 4 and 5 with the result that sheave segment 212 is axially displaced in an upward direction against the bias of spring 232 to reduce the pitch diameter of pulley assembly 210, thereby maintaining substantial alignment of belt 98. By maintaining proper belt alignment in this manner, wear of belts 62 and 98 is minimized. Springs 76 and 232 urge their associated sheaves into snug engagement with belts 62 and 98 respectively to thus maintain proper belt tension throughout the range of pulley speed adjustment.

From the foregoing description it also will be appreciated that the overall height of pulley assemblies 63, 64, and 210 and of the parts for adjusting the pulley ratio is minimized especially by the parallel side-by-side arrangement of bar 158 and sleeve 92, by the construction of lifter arm 136 and by the relative arrangement of springs 76 and 232 which are respectively located below belt 62 and above belt 98.

With continued reference to FIGURE 5, shaft 220 extends downwardly through the top wall of gear box 120 and is mounted in a bushing 240 for rotation about an axis extending parallel to that of shafts 103 and 52. Bushing 240 is pressed into a fitting 242 which is threaded into the top wall of gear box 120 in the manner shown. Thus, it is apparent that the rotational axes of shafts 52, 103, and 220 are in fixed parallel spaced apart relationship to each other with shaft 220 being mounted on gear box rearwardly of shaft 103 and bar 158.

From the foregoing description it will be appreciated that shafts 103 and 220 together with pulley assemblies 64 and 210 and the various parts involved for adjusting pulley assembly 64 are all conveniently and compactly mounted on gear box 120 for ready access by the operator. In providing for an exceptional space saving, compact arrangement of the power feed mechanism parts, gear box 120, as best shown in FIGURES 1 and 3, is mounted on the right-hand side of housing 26 and shaft 52 is mounted on the left-hand side of housing 26 so that the axis of spindle 29 is disposed between the axes of shafts 52 and 103. Belt 62, as shown in FIGURE 1, extends through an opening 243 formed in housing 26.

Figure 7:
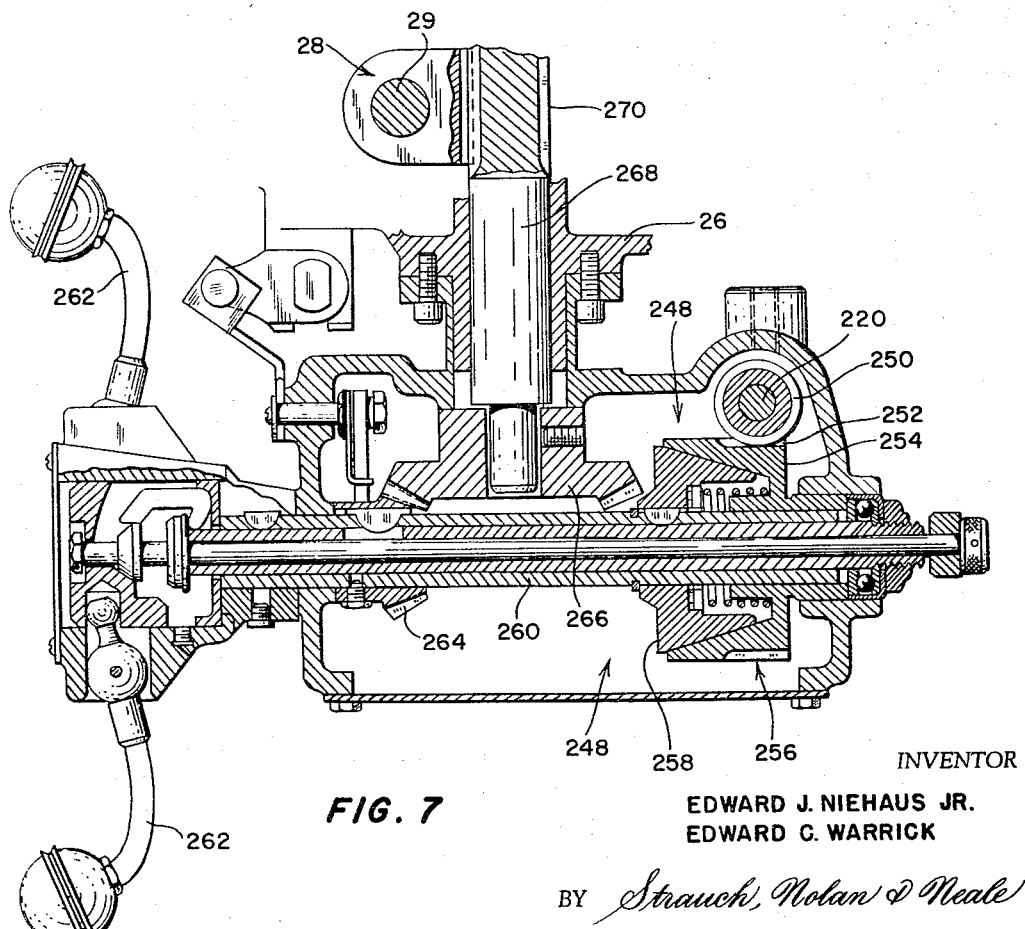
FIGURE 7 is a section taken substantially along lines 7—7 of FIGURE 1.

With reference now to FIGURE 7, shaft 220 is connected by a drive train 248 to the quill of quill and spindle assembly 28 for advancing spindle 29 in a tool feeding direction. Drive train 248 is preferably of the same construction as that described in the aforesaid Pettigrew patent and essentially comprises a worm 250 non-rotatably secured to the portion of shaft 220 extending into gear box 120. Worm 250 constantly meshes with a gear 252 formed integral with an input element 254 of a clutch assembly 256.

As described in detail in the aforesaid Pettigrew patent, clutch assembly 256 comprises an output clutch element 258 cooperating with element 254 to impart rotation to a shaft 260 which is supported in gear box 120 for rotation about an axis extending at right angles to the axis of shaft 220. Clutch assembly 256 is selectively engaged and disengaged by manually manipulatable control knobs 262 which are operatively connected to shaft 260 in the manner explained in the aforesaid Pettigrew patent.

With continued reference to FIGURE 7, a bevel gear 264 mounted for rotation with shaft 260 constantly meshes with a bevel gear 266 which is fixed to a cross shaft 268. Shaft 268 extends into and rotatably supported in housing 26 and is provided with gear teeth 270 which constantly mesh with a rack formed integral with the quill of quill and spindle assembly 28.

From the foregoing description of the spindle drive and power feed mechanism of this invention, it is clear that the power for axially advancing quill and spindle assembly 28 in a tool feeding direction is taken from pulley 18 (FIGURE 2) which is splined to spindle 29. As a result, the ratio of spindle rotational speed to spindle linear speed in a tool feeding direction is maintained constant for any adjusted speed setting of spindle 29, which is varied by selective adjustment of belt and pulley assembly 30 or as the speed spindle speed slows down when tool 43 cuts into a workpiece. The absolute feed speed, being correlated with the spindle rotational speed, is correspondingly varied to minimize gouging of the workpiece and tool damage.

As best shown in FIGURE 3, indicator assembly 208 comprises a pointer 286 which is non-rotatably mounted on a bolt 288. Bolt 288 rotatably extends through a bushing 290 and is threaded into an acorn nut 292 forwardly of a front support plate 294. Plate 294 is suitably fixed to bracket 117 and horizontally mounts bushing 290 with a press fit.

As shown in FIGURES 3 and 8, the hub of pointer 286 is axially confined between nut 292 and a washer 296 which is mounted on bolt 288 adjacent the forwardly directed end face of bushing 290. Rearwardly of plate 294, a flat sided lever 298 is non-rotatably mounted on an intermediate non-circular section 300 of bolt 288 and is axially confined between the head of bolt 288 and a washer 302. Washer 302 is axially retained on bolt 288 between bushing 290 and lever 298.

With continued reference to FIGURES 3 and 8, a motion transmitting rod 304 is formed with a smooth walled, cylindrical end section 306 which slidably extends through a mating aperture 308 formed in lever 298 about axis extending in parallel spaced apart relation to the rotational axis of bolt 288. Rod 304 is provided with an intermediate vertical section 309 which integrally joins section 306 to a rearwardly extending threaded end section 310. Section 310 extends through a bore 311 formed in lifter arm 136. Jam nuts 314 and 316 threaded on section 310 on opposite sides of web 155 secure rod 304 for unitary movement with arm 136.

Figure 6:
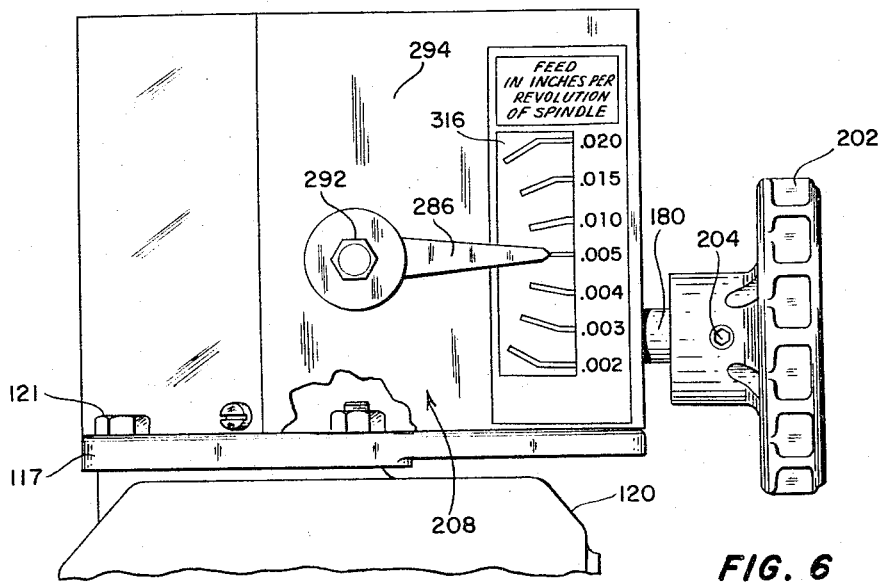
FIGURE 6 is a section taken substantially along lines 6—6 of FIGURE 3.

By raising or lowering arm 136 with the foregoing construction, lever 298 is rocked to rotate bolt 288 and, consequently, swing pointer 286 in a corresponding direction. Pointer 286, as best shown in FIGURE 6, cooperates with a forwardly facing scale 316 mounted on plate 294 and graduated in the manner shown to provide a direct and convenient reading of the adjusted tool feed rate in inches per revolution of spindle 29.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a drill press or the like, a rotatable and axially reciprocable tool spindle, means providing a power source, a selectively adjustable steplessly variable speed pulley transmission having an input and an output, means for selectively drive connecting said output to axially advance said spindle in a tool feeding direction, and variable speed drive train means drivingly connecting said power source to said input side and to said spindle for simultaneously rotating and axially advancing said spindle at correlated rotational and linear speeds.

2. The machine tool defined in claim 1 wherein said drive train means comprises a belt drive and variable speed pulley assembly having an input pulley drive connected to said power source and an output pulley drive connected to said spindle, and wherein said machine tool further comprises manually manipulatable tool feed means, and means for selectively disconnecting said output of said variable speed pulley transmission from said spindle and drive connecting said manually manipulatable tool feed means thereto to provide for a manually manipulated axial advancement of said spindle.

3. In a power tool, a rotatable and axially reciprocable tool carrying spindle, a power driven, variable speed transmission drivingly connected to rotate said spindle, a selectively adjustable, steplessly variable speed power feed pulley assembly having an input and an output, first and second of resiliently expansible variable pitch pulley assemblies, means rotatably mounting said first, second and variable speed power feed pulley assemblies about parallel fixedly spaced apart axes, a first belt drivingly connecting said first variable pitch pulley assembly to said input, a second belt drivingly connecting said output to said second variable pitch pulley assembly, means drive connecting the output of said variable speed transmission to said first variable pitch pulley assembly, and means for selectively drive connecting said second variable pitch pulley assembly to said spindle to transmit power for axially advancing said spindle in a tool feeding direction whereby the linear speed of said spindle is correlated with the spindle rotational speed.

4. The power tool defined in claim 3 wherein said first and second variable pitch pulley assemblies respectively comprise oppositely facing, axially fixed belt engaging pulley surfaces and wherein said variable speed power feed pulley assembly comprises first and second oppositely facing axially fixed belt engaging pulley surfaces facing in the opposite direction, said first belt being axially confined between said first belt engaging pulley surface and the belt engaging pulley surface of said first pulley assembly, said second belt being axially confined between said second belt engaging pulley surface and the belt engaging pulley surface of said second pulley assembly.

5. The power tool defined in claim 4 wherein each of said first and second pulley assemblies comprises an axially shiftable belt engaging sheaves segment and means resiliently biasing said sheave segment toward its associated pulley assembly axially fixed, belt engaging pulley surface.

6. The power tool defined in claim 5 wherein said variable speed power feed pulley assembly comprises a pair of axially displaceable outer sheave segments, and means for axially shifting said outer sheave segments as a unit, said first and second pulley surfaces comprising opposite faces of a center sheave segment axially fixed between said outer sheave segments and cooperating therewith to define the input and output sides of said variable speed pulley assembly.

7. The power tool defined in claim 6 wherein said means for axially shifting said outer sheave segments comprises an axially shiftable sleeve, means fixing said outer sheave segments in axially spaced apart relationship on said sleeve, an axially displaceable shift member mounted in parallel spaced apart, side-by-side relation with said sleeve, a rigid arm axially fixed to corresponding ends of said shift member and said sleeve, and means for selectively axially displacing said shift member in opposite directions to thereby effect a corresponding axial displacement of said sleeve and said outer sheave segments mounted thereon.

8. The power tool defined in claim 7 wherein said means rotatably mounting said variable speed power feed pulley assembly comprises an axially fixed, rotatably mounted shaft, and means non-rotatably mounting said sleeve and said center sheave segment on said shaft but permitting axial displacement of said sleeve thereon.

9. In a power tool having a rotatably and reciprocably mounted member adapted to carry a cutting tool, means including a power source for rotating said member, a steplessly variable speed power feed pulley and shaft assembly having an input and an output, means drive connecting said power source to said input and means drive connecting said output to axially advance said member in a tool feeding direction, said pulley and shaft assembly comprising a rotatably mounted, axially and laterally fixed shaft, a sleeve slidably and coaxially mounted on said shaft, cooperating means comprising a pin and slot connection on said shaft and said sleeve permitting limited axial displacement of said sleeve but non- rotatably fixing said sleeve to said shaft, a pair of axially spaced apart outer pulley sheave segments coaxially fixed on said sleeve, a center sheave segment rotatably and slidably mounted on said sleeve axially between said outer sheave segments by the pin of said pin and slot connection, and means for axially displacing said sleeve to selectively vary the pulley pitch diameter between said center sheave segment and each of said outer sheave segments.

10. The power tool defined in claim 9 wherein said means for axially displacing said sleeve comprises a pulley sheave shift member mounted for limited axial displacement in parallel spaced apart, side-by-side relation to said sleeve, a rigid arm axially fixed to corresponding ends of said shift member and said sleeve for effecting axial displacement of said sleeve unitarily with said shift member, and means for selectively axially displacing said shift member.

11. The power tool defined in claim 9 wherein said means for axially displacing said sleeve comprises a manually manipulatable, rotatably mounted shaft means, first gear means rigid with said shaft means, second gear means meshing with said first gear means, means retaining said second gear means against axial displacement but permitting rotation thereof, a shift member rotatably mounted for limited axial displacement and being threadedly engaged with said second gear means for axial displacement by rotation of said shaft means, and means securing said sleeve to said shift member for unitary axial displacement therewith.

12. In a drill press having a housing and an axially reciprocable quill and rotatable tool carrying spindle coaxially journalled on said quill, comprising a motor, a variable speed transmission drive connecting said motor to said spindle to rotate the latter, a power feed train including a selectively adjustable steplessly variable pulley assembly drive connecting said spindle to the quill for axially advancing said quill and spindle assembly in a tool feeding direction at a speed having a selected correlation to the spindle rotational speed, manually manipulatable tool feed means, and means for selectively disconnecting said selectively adjustable variable pulley assembly from said quill and for drive connecting said manually manipulatable tool feed means thereto to provide for a manually manipulated axial advancement of said spindle during power driven rotation thereof.

13. The drill press defined in claim 12 wherein said power feed train comprises first and second shafts rotatably mounted in parallel, fixedly spaced apart relation to said spindle rotational axis, a belt drive and pulley assembly drive connecting said spindle to said first shaft, first and second resiliently expansible, variable pitch pulley assemblies respectively mounted on said first shaft and said second shaft, and belts respectively drive connecting said first variable pitch pulley assembly to the input side of said variable speed pulley assembly and the output side of said variable speed pulley assembly to said second variable pitch pulley assembly, said second shaft being connected to said quill by said means for disconnecting said selectively adjustable variable pulley assembly from said quill.

14. In a drill press, a drill head comprising an axially movable quill, a spindle rotatably mounted on said quill, a rotor equipped motor, a drive train drive connecting the motor and the spindle for imparting rotation to the latter in response to rotation of the rotor of the former and including means selectively variable within a predetermined range for providing an infinite variety of speed ratios within such range between the motor rotor and the spindle, a further drive train having its input connected to said spindle and its output selectively connected to impart longitudinal movement to said quill and including means selectively variable within a predetermined range for providing an infinite variety of speed ratios within such range between the input and output of said further drive train whereby the operator has available an infinite selection of spindle rotation rates and an infinite selection of spindle rotation rate to spindle feed rate ratios within such predetermined ranges.

15. The drill press defined in claim 14 comprising manually manipulatable spindle feed means and clutch means selectively actuatable for disconnecting the output of said further drive train and for operatively connecting said manually manipulatable feed means to said quill for effecting manual advancement of said spindle in a tool feeding direction.

References Cited by the Examiner

UNITED STATES PATENTS

| | | | |
|---|---|---|---|
| 13,845 | 11/1855 | Heacock | 77—32.1 |
| 1,291,098 | 1/1919 | Osterholm | 77—32.1 |
| 1,403,991 | 1/1922 | Vedovelli | 77—29 |
| 2,233,822 | 3/1941 | Schubbe | 74—230.17 |
| 2,251,488 | 8/1941 | Hucke | 74—230.17 |
| 2,464,841 | 3/1949 | Alexander | 74—230.17 |

FRANCIS S. HUSAR, *Primary Examiner.*